W. J. JEFFRIES.
CEMENT PIPE MACHINE.
APPLICATION FILED OCT. 6, 1908.

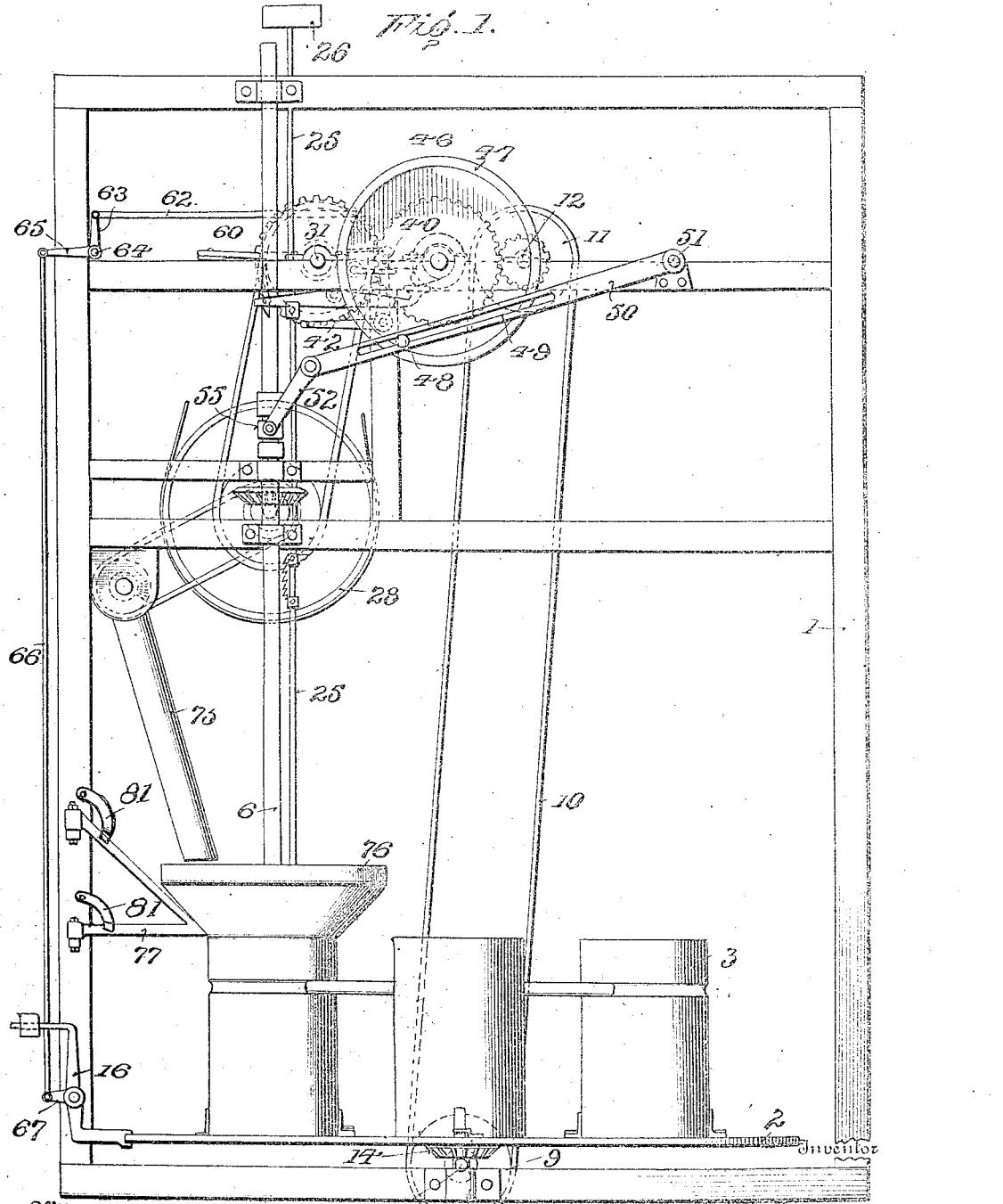

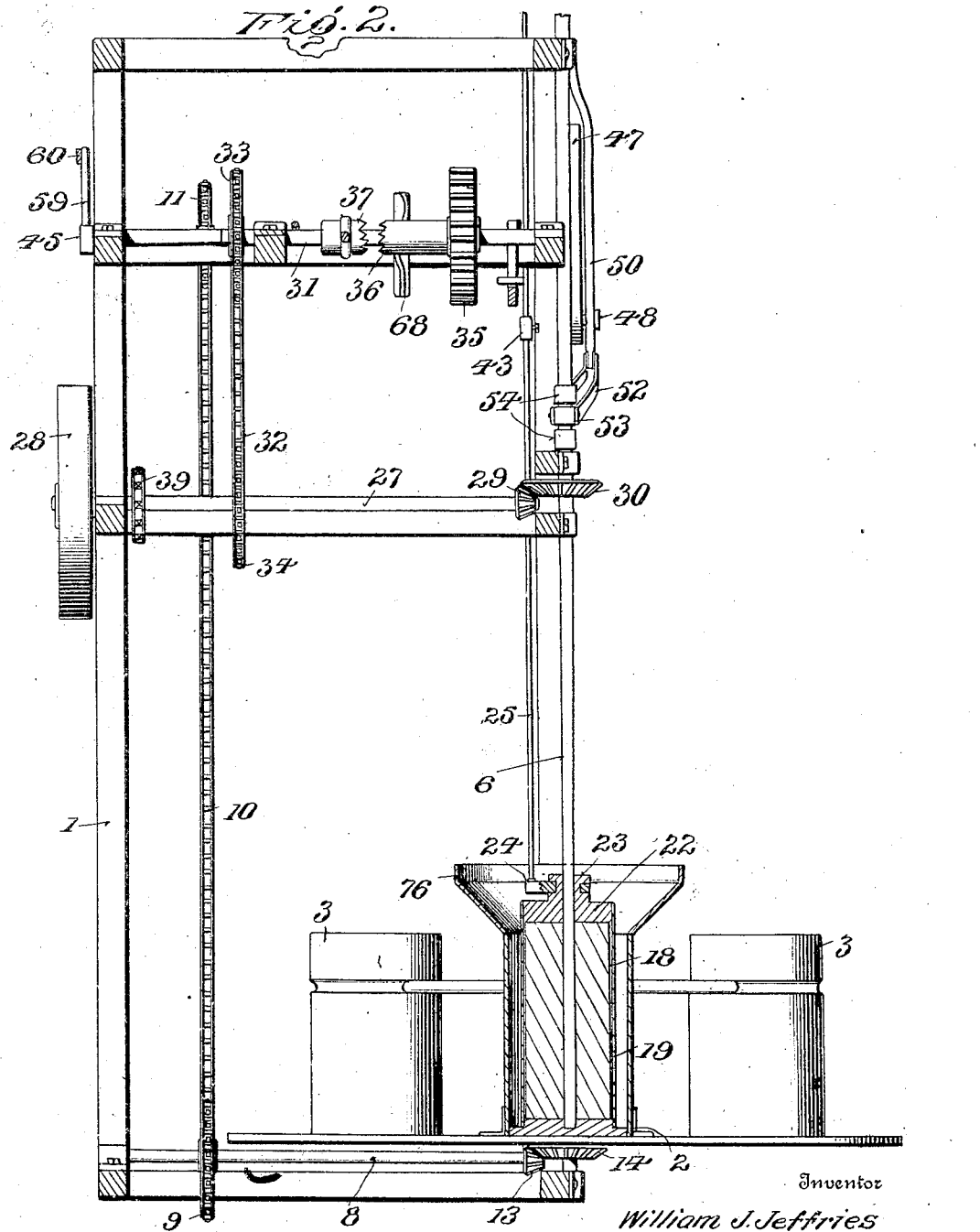

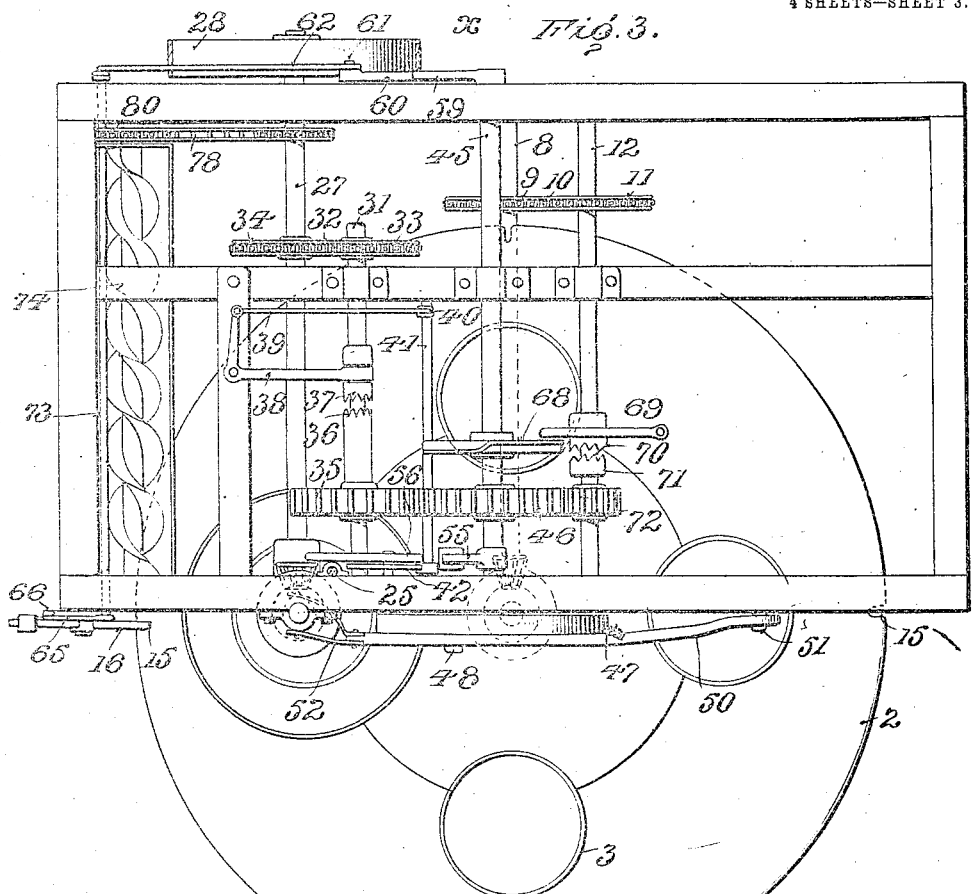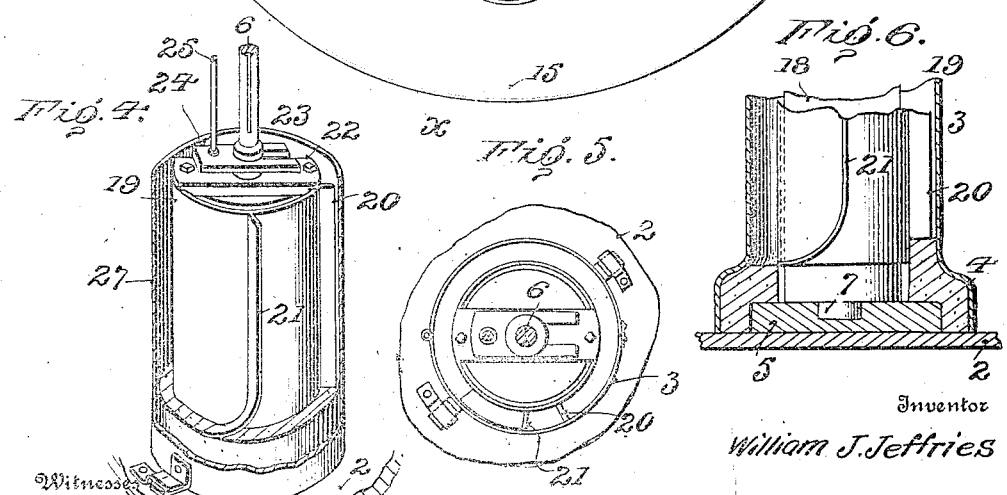

932,023.

Patented Aug. 24, 1909.
4 SHEETS—SHEET 4.

Inventor
William J Jeffries

UNITED STATES PATENT OFFICE.

WILLIAM J. JEFFRIES, OF TACOMA, WASHINGTON.

CEMENT-PIPE MACHINE.

932,023.  Specification of Letters Patent.  Patented Aug. 24, 1909.

Application filed October 6, 1908. Serial No. 456,385.

*To all whom it may concern:*

Be it known that I, WILLIAM J. JEFFRIES, citizen of the United States, residing at Tacoma, in the county of Pierce and State of Washington, have invented certain new and useful improvements in Cement-Pipe Machines, of which the following is a specification.

The present invention provides a machine for manufacture of pipes or tubes of cement and embodies mechanism for performing the several steps in a positive automatic manner, whereby the manual labor is reduced to a minimum.

The machine contemplates a molding mechanism embodying a core, an outer casing and a packer, the latter being of a compressive type in contradistinction to a tamping packer, whereby the pipe is rendered uniform and the surfaces smooth and free from air holes, such as are common in cement articles produced by the tamping process. A carrier supports the molds and preferably consists of a rotary table. The packer for compressing the cement in the mold is rotary and comprises a support of cylindrical form and two coöperating elements, the one for leveling the material in the mold, and the other for compressing the same by a troweling action. The packer is positively driven and at the same time is free to move so as to adapt itself to the pipe in its several stages of formation.

The machine also embodies mechanism for automatically throwing the several parts into and out of operative position as the work progresses, thereby admitting of the completed pipe being moved and molds placed in position upon the carrier to be advanced thereby into operative position.

For a full understanding of the invention and the merits thereof and also to acquire a knowledge of the details of construction and the means for effecting the result, reference is to be had to the following description and accompanying drawings.

Figure 7:
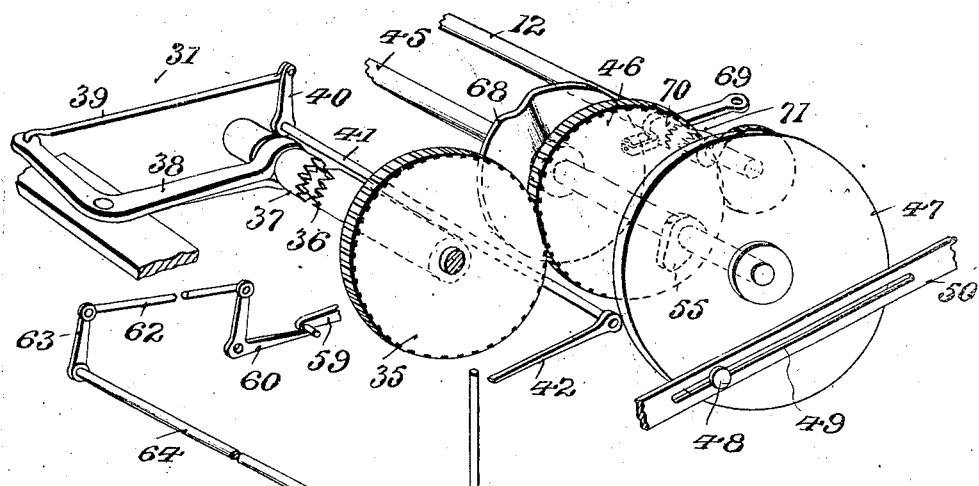
Figures 8, 9:
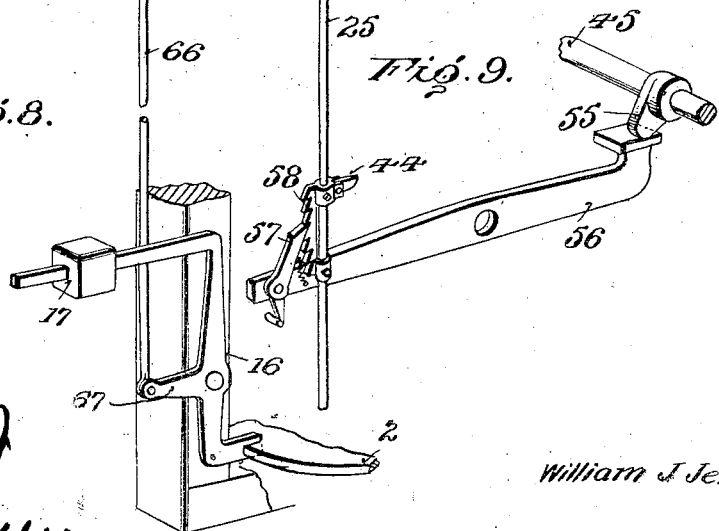

While the invention may be adapted to different forms and conditions by changes in the structure and minor details without departing from the spirit or essential features thereof, still the preferred embodiment is shown in the accompanying drawings, in which:

Figure 1 is a view in elevation of a machine embodying the invention. Fig. 2 is a vertical transverse section on the line *x—x* of Fig. 3, looking to the right, as indicated by the arrows, the rotary table and molds thereon being in full lines. Fig. 3 is a top plan view of the machine. Fig. 4 is a perspective view of a mold, parts being broken away. Fig. 5 is a top plan view of the parts shown in Fig. 4. Fig. 6 is a sectional view of a modification, showing a form of mold for providing a bell at one end of the pipe. Fig. 7 is a perspective view of a portion of the operating mechanism. Fig. 8 is a detail view in perspective of the catch for holding the rotary table in fixed position and the means coöperating therewith for releasing said catch. Fig. 9 is a detail perspective view of the means for lifting the packer, so as to clear the mold and pipe, preliminary to moving the same from the carrier or rotary table.

Corresponding and like parts are referred to in the following description and indicated in all the views of the drawings by the same reference characters.

The working parts of the machine are mounted upon a framework 1 which is of suitable construction best adapted for the capacity and size of the machine and the relation of the coöperating parts. A carrier or rotary table 2 is mounted upon the framework and is adapted to receive and support the molds 3 which are held in place by any desired means. The molds may be straight, as indicated in Figs. 1, 2 and 4, or may be provided at one end with an enlarged portion 4 to provide a flare or bell at one end of the pipe. Blocks 5 are secured to the carrier or table 2 to receive the lower ends of the molds and the end of the shaft 6 which is stepped therein, each of said blocks 5 having a recess 7 in its upper side to receive the lower end of the shaft 6 to steady the same. A shaft 8 mounted in bearings provided on members of the framework, is geared at one end to the table 2 so as to impart a rotary movement thereto and is supplied with a sprocket wheel 9 by means of which motion is imparted thereto through the instrumentality of a sprocket chain 10, the latter passing around a sprocket wheel 11 fast to a shaft 12 mounted in bearings near the upper end of the framework. A bevel pinion 13 at the inner end of the shaft 8 meshes with a bevel gear wheel 14 fast to the lower side of the table 2. A series of notches 15 are provided in the edge of the rotary table 2, one for each mold, and these notches are adapted to receive the end of a catch 16 so as to hold the table against possible movement during the formation of the pipe. The catch 16 is of elbow form and is provided with a weighted arm 17 which serves to hold the catch in operative position. The molds 3 may be of any size and shape according to the nature of the pipe to be constructed. A core 18 coöperates with each mold and the space between the core and mold corresponds to the thickness of the pipe to be formed. The core 18 is connected with the shaft 6 so as to move therewith, whereby said core may be withdrawn from the pipe after the same has been completed. The shaft 6 passes centrally through the core 18 and its lower end enters the recess 7 in the upper side of the block 5, thereby centering the core and preventing lateral displacement thereof.

The packer consists of a support 19 which is of cylindrical form and fits the core snugly about which it rotates when the machine is in operation. A leveler and distributer 20 is attached to a side of the cylinder support 19 and consists of a strip or bar, its purpose being to spread the cement in layers in advance of the compressor. The compressor 21 likewise consists of a strip or bar attached to a side of the cylinder support 19 and is located a short distance in the rear of the leveler and distributer. The lower end of the compressor is curved rearwardly and extends some distance below the part 20 so as to ride upon and compress the material by a troweling action. A cross head 22 is bolted or otherwise firmly attached to the upper end of the cylindrical support 19 and is apertured to receive the shaft 6. A boss or hub 23 is provided upon the upper or outer side of the cross head 22 and is formed with an annular groove to receive the forked or spaced portions of a pressure piece 24. A pressure rod 25 is connected at its lower end to the pressure piece 24 and is adapted to move vertically with the packer and it is directed in its vertical movements by suitable guides attached to the framework. A weight 26 is applied to the upper end of the pressure rod 25 and may be of any mass corresponding to the degree of compression to which it is desired to subject the material in the formation of the pipe. This construction admits of the application of a variable pressure to the packer without interfering with its free rotation, it being understood that the weight 26 may be replaced by other weights of different mass. A suitable connection is provided between the shaft 6 and the cross head 22 to insure rotation of the packer with the shaft without interfering with the movement of the packer on said shaft as the length of the pipe increases during the formation thereof.

A power shaft 27 is provided with a pulley 28 which is adapted to receive movement from any suitable source of power in any well known way. A bevel pinion 29 at one end of the drive shaft 27 meshes with a bevel gear wheel 30 mounted in bearings of the framework and in return receiving the shaft 6 which is slidable therein, but connected for rotation therewith in any adjusted position. A shaft 31 is mounted in bearings of the framework and is connected by sprocket chain 32 and sprocket wheels 33 and 34 with the drive shaft 27 so as to receive movement therefrom. A gear wheel 35 loose upon the shaft 31 is provided with a half clutch 36 which is adapted to coöperate with a half clutch 37 mounted upon the shaft 31 to move thereon and to rotate therewith. When the clutch members 36 and 37 are in engagement, the shaft 31 and gear wheel 35 rotate, but when said clutch members are separated, the shaft 31 may be rotated without imparting movement to the gear wheel 35 or the parts deriving movement from said gear wheel. A shipper lever 38 is in engagement with the clutch member 37 to effect movement thereof upon the shaft 31. A rod 39 connects the opposite end of the shipper lever 38 with an arm 40 fast to one end of a rock shaft 41, said rock shaft having a trip arm 42 which is adapted to be engaged by stops 43 and 44 applied to the pressure rod 25. The stop 44 engages with the trip arm 42 when the packer is at the top of the mold, thereby throwing the gear wheel 35 into gear. A stop 43 engages with the arm 42 and trips the same when the packer is near the limit of its downward movement so as to throw the gear wheel out of action. The stop 44 is pivoted so as to clear the trip arm 42 when descending. A shaft 45 parallels the shaft 37 and is mounted in bearings applied to the framework. A gear wheel 46 fast to the shaft 45 is in mesh with the gear wheel 35 and receives motion therefrom. A crank wheel 47 is fast to the outer end of the shaft 45 and its crank pin 48 operates in a slot 49 of a lever 50 pivoted at 51 to the main frame and connected by link 52 with the shaft 6 so as to raise and lower the same. The link 52 is connected to a collar 53 loose on the shaft 6 and confined between stop collars 54. As the shaft 45 rotates, the lever 50 is oscillated and by reason of its connection with the shaft 6 causes the latter to move upward and lift the core 18 clear of the mold and to descend so as to lower said core into the next mold placed in position.

A cam 55 fast to the shaft 45 is adapted to engage with one end of a lever 56 at the initial movement of the shaft 45, thereby operating said lever to lift the packer clear of the mold and the completed pipe. The lever 56 is provided at the end opposite that engaged by the cam 55 with a pawl 57 designed to engage with the teeth of a rack bar 58 fast to the pressure rod 25 so as to lift the latter and the packer connected therewith. This operation takes place when the pipe is completed and a moment after the gear wheel 35 has been thrown into clutched engagement with the shaft 31. The rack bar 58 is adjustable on the pressure rod 25 and preferably carries the lower stop 44 so that the predetermined relationship between the rack bar and stop 44 are maintained at all adjustments of the rack bar upon the rod 25.

When the packer and core are elevated, the carrier or table 2 is released by means of an arm 59 fast to one end of the shaft 45 engaging with one arm of a bell crank 60 pivoted at 61 to the framework and having its other arm connected by means of a rod 62 with an arm 63 fast to one end of a rock shaft 64, said rock shaft having an arm 65 at its opposite end which is connected by rod 66 with an arm 67 projected out from the catch 16. During the rotation of the shaft 45 and a moment before the crank pin 48 reaches its highest point, the crank arm 59 trips the bell crank 60 and through the connections just described moves the catch 16 so as to clear the notch 15 of the table 2 and at this instant said table is rotated a distance to bring the next mold in position to receive the core and packer.

During the time that the core and packer are at their highest points and while the table 2 is released, the means for turning said table are thrown into action. This result is effected by means of a cam 68 fast to the shaft 45 and in engagement with a shipper lever 69 adapted to operate a clutch member 70 mounted upon the shaft 12 so as to move thereon and rotate therewith. A coöperating clutch member 71 is fast to a gear wheel 72 loose upon the shaft 12 and in mesh with the gear wheel 46, whereby when the clutch members 70 and 71 are in engagement the shaft 12 and gear wheel 72 rotate and impart movement to the shaft 8 through the gearing 9, 10 and 11. The parts are so timed and proportioned that the instant the table 2 moves a distance to bring the next mold in position to receive the core and packer, the catch 16 enters a notch 15 and locks the table and the clutch members 70 and 71 are thrown out of engagement. The cam 68 throws the clutch members 70 and 71 out of engagement.

The material for forming the pipe is supplied to a trough 73 in which operates a screw feeder 74, a spout 75 leading from the discharge end of said trough to deliver the material into a hopper 76 carried by a swinging bracket 77 hinged to a continued part of the framework to admit of the hopper being swung out of the way to admit of the removal of the mold and pipe and the placing of a new mold in position. The screw feeder 74 is adapted to be operated from the shaft 27 by means of a sprocket chain 78 which passes around a sprocket wheel 79 fast to the shaft 27 and a sprocket wheel 80 fast to the shaft of the screw feeder 74.

The cam 55 and the arm 56 are employed for the purpose of raising the rod 25, through the medium of the pawl 57 and the rack 58, to lift the lower end of the packer from the molded pipe so as to clear the upper edge of the same prior to the removal of the core 18 to prevent injury to the molded pipe during the operation of the machine. This movement is effected by the rotation of the cam 55, which is carried upon the shaft 45, prior to the engagement of the cam 68 with the shifting lever 69 to actuate the crank wheel 47 which raises the shaft 6 and core 18 carried thereby.

The bracket 77 is rigidly held in operative position by a spring catch 81 which is mounted on the frame of the machine adjacent the bracket 77 and adapted for detachable engagement with one of the arms thereof.

Having thus described the invention, what is claimed as new is:

1. In a machine of the character described, the combination of a mold, a core located within the mold, a packer for compressing the material, a shaft connected with the core and adapted to impart rotation to said packer, a pressure rod connected with the packer and movable therewith, and means for moving said shaft longitudinally to withdraw the core from the mold and adapted to be thrown into gear by the said pressure rod.

2. In a machine of the character described, the combination of a mold, a core located therein, a packer for compressing the material, a shaft having connection with said core and adapted to impart rotary movement to the packer, a pressure rod connected with the packer, stops connected with the pressure rod, operating means for moving the shaft to withdraw the core from the mold and to replace the said core therein and adapted to be thrown into and out of gear by the aforesaid stops.

3. In a machine of the character described, the combination of a mold, a core located therein, a packer for compressing the material, a shaft having connection with said core and adapted to impart rotary movement to the packer, a pressure rod connected with the packer, stops connected with the pressure rod, operating means for moving the shaft to withdraw the core from the mold and to replace the said core therein and adapted to be thrown into and out of gear by the aforesaid stops, and means coöperating with the pressure rod and actuated by the operating gearing when in action to lift the packer clear of the mold after the article has been completed to admit of another mold being placed in position.

4. In combination, a carrier provided with a series of molds, actuating means for said carrier, a core and packer adapted to coöperate with the several molds, means for withdrawing and replacing the core, a pressure rod connected with the packer and movable therewith, and means operated by said pressure rod to throw said actuating means for said carrier into and out of engagement to consecutively register the molds with said core and said packer.

5. In a machine as specified, the combination of a carrier, a series of molds disposed on said carrier, means for intermittently rotating said carrier, a core and packer adapted to coöperate with said core, means for withdrawing and replacing said core, a pressure rod disposed adjacent said core and having operative connection with the same, and operative means connected to said pressure rod to actuate said means for operating said carrier.

6. In a machine as specified the combination of a frame, a carrier mounted on said frame, a series of molds disposed on said carrier, a core carried by said frame, a power shaft mounted in said frame, a secondary shaft connected to said power shaft and carried by said frame, said power shaft adapted to rotate said core, a clutch disposed on said secondary shaft, a packer carried by said core and operatively connected to said clutch, a third shaft carried by said frame, means disposed on said third shaft to raise said core, a fourth shaft mounted on said frame and connected to said carrier to actuate the same, a clutch disposed on said fourth shaft to set the same in motion, and a cam disposed on said third shaft for throwing said clutch on said fourth shaft into operation at times to actuate said carrier.

In testimony whereof I affix my signature in presence of two witnesses.

WILLIAM J. JEFFRIES. [L. S.]

Witnesses:
J. H. HARPER,
NICOLAY HASSELO.